UNITED STATES PATENT OFFICE.

ADOLF WACK, OF BELLEVILLE, NEW JERSEY, ASSIGNOR TO VERONA CHEMICAL COMPANY, OF NEWARK, NEW JERSEY, A CORPORATION OF NEW JERSEY.

PROCESS OF MAKING AROMATIC CARBONYL DERIVATIVES.

No. 898,942.  Specification of Letters Patent.  Patented Sept. 15, 1908.

Application filed July 2, 1907. Serial No. 381,835.

*To all whom it may concern:*

Be it known that I, ADOLF WACK, subject of the Emperor of Germany, residing at Belleville, in the county of Essex and State of New Jersey, have invented new and useful Improvements in the Manufacture of Aromatic Carbonyl Derivatives, of which the following is a specification.

In the production of aromatic aldehydes and aromatic ketones, hereinafter generically called aromatic carbonyl derivatives, by oxidation the amount of the desired aromatic carbonyl derivatives produced is generally much below that amount theoretically possible.

The object of the present invention is to provide means of increasing the amount of aromatic carbonyl derivative produced by oxidation beyond that amount heretofore producible by oxidation without the aid of this invention.

Now, I have discovered that when certain substances, which are primary aromatic amino substances inclusive of their salts, their sulfo-acids and salts thereof, are mixed with the material to be oxidized to form an aromatic carbonyl derivative, the amount of the latter which is produced upon oxidation of the mixture is greater than when such primary aromatic amino substances (hereinafter generically termed primary aromatic amino substances) are not employed.

Among the primary aromatic amino substances which I have employed in the practice of this, my, invention are: anilin; anilin sulfo-acid, particularly the para-variety thereof; naphthylamin, particularly the alpha-variety thereof and naphthylamin sulfo acid particularly the 1.naphthylamin.4.sulfo acid variety thereof. These may be employed as free base, free acid or salt of base or salt of acid without materially affecting the result. The oxidizing agents which have been found to be most favorably influenced thereby are the acid oxidizing agents and particularly such as produce no undissolved material in the course of their action and more particularly sodium bichromate and sulfuric acid or chromic acid and acetic acid, or any of their well-known equivalents. Other modes of oxidation, for example, such as employ a permanganate in acid, alkaline or neutral condition, or electrolytic methods of oxidation or such as involve the use of ozone also have the percentage amount of aromatic carbonyl derivative produced by them favorably affected by the addition of the aforementioned aromatic amino - substance to the material to be oxidized.

Among the aromatic carbonyl derivatives whose percentage amount of production by oxidation is favorably influenced by the use of my invention I mention vanillin, acidyl-vanillin, particularly the acetyl variety thereof, camphor, heliotropin, anisic aldehyde.

The initial material to be oxidized into aromatic carbonyl derivative may be any of the materials suitable for the production of such aromatic carbonyl derivative such as, for example, (a) aromatic substances with unsaturated fatty side chain as: isosafrol, acetisoeugenol, anethol; (b) cyclic secondary aromatic alcohols such as borneol, inclusive of its esters especially its acetic acid esters, iso-borneol, inclusive of its esters especially its acetic acid ester, all of which are hereinafter generically referred to as "aromatic substances."

The following examples will serve as a practical illustration of a way in which my invention may be practiced but I, of course, do not regard my invention as limited to the exact quantities, proportions or conditions set forth since these may be varied within wide limits without departing from my invention and because the favorable influence of my invention is discernible in all ordinary conditions of proportion, quantities and strengths. The parts are by weight:

*Preparation of acetyl vanillin.*—Mix together one hundred (100) parts of acetylisoeugenol, thirty (30) parts of sulf anilic acid, fifteen hundred (1500) parts of water and raise the temperature of the resulting mixture to the melting point of the acetylisoeugenol which is about eighty (80°) degrees centigrade; when all the acetyliso eugenol is melted add to this mixture slowly and in a fine stream a mixture of two hundred and fifty (250) parts of sodium bichromate, four hundred (400) parts of water, two hundred and fifty (250) parts of sulfuric acid of ninety-five per cent. (95%) $H_2SO_4$, while keeping the temperature of the resulting mixture between seventy-four (74°) degrees and seventy-eight (78°) degrees centigrade; the time for admixture of the oxidizing agent with the material to be oxidized should ordinarily not be more than forty (40) minutes;

now maintain the temperature of the mixture between seventy-four (74°) and seventy-eight (78°) degrees centigrade for about five (5) to ten (10) minutes longer at the end of which time the production of acetyl vanillin is ordinarily completed and the product may be isolated in any suitable manner.

*Preparation of camphor.*—Dissolve fifty (50) parts of isoborneol in one hundred (100) parts of benzol; intimately mix therewith a solution of fifteen (15) parts of sulfanilic acid in five hundred (500) parts of water; heat this mixture in a vessel provided with a return condenser to the boiling point of the benzol and while stirring the mixture thoroughly add continuously a mixture made up of one hundred (100) parts of sodium bichromate, two hundred (200) parts of water and one hundred (100) parts of sulfuric acid of ninety-five (95 %) per cent. $H_2SO_4$ in such a manner that this addition requires about one hour; then continue the heating for about ten minutes longer; then separate and remove the benzol layer; remove the benzol by suitable distillation; the residue is the desired product. In practice in this manner forty-nine (49) parts of camphor have been obtained and which without further purification possesses a melting point of one hundred and seventy-five (175°) to one hundred and seventy-six (176°) degrees centigrade.

The manufacture of camphor above referred to is not herein specifically claimed as the right to such claim is reserved for another application, said divisional application being filed 27 December 1907 and numbered 408,331.

Now what I claim is:

1. The improvement in the manufacture of a hereinbefore defined aromatic carbonyl derivative which consists in submitting a mixture containing a hereinbefore defined primary aromatic amino-substance and a hereinbefore defined aromatic substance to oxidation.

2. The improvement in the manufacture of acetyl vanillin which consists in submitting a mixture of acetylisoeugenol and a hereinbefore defined primary aromatic amino substance to oxidation.

3. The improvement in the manufacture of acetyl-vanillin which consists in submitting a mixture of acetylisoeugenol and sulfanilic acid to oxidation.

In testimony whereof I have hereunto set my hand in the presence of two subscribing witnesses.

ADOLF WACK.

Witnesses:
W. C. HAUFF,
EDWIN KUTTROFF.